Figure 1:
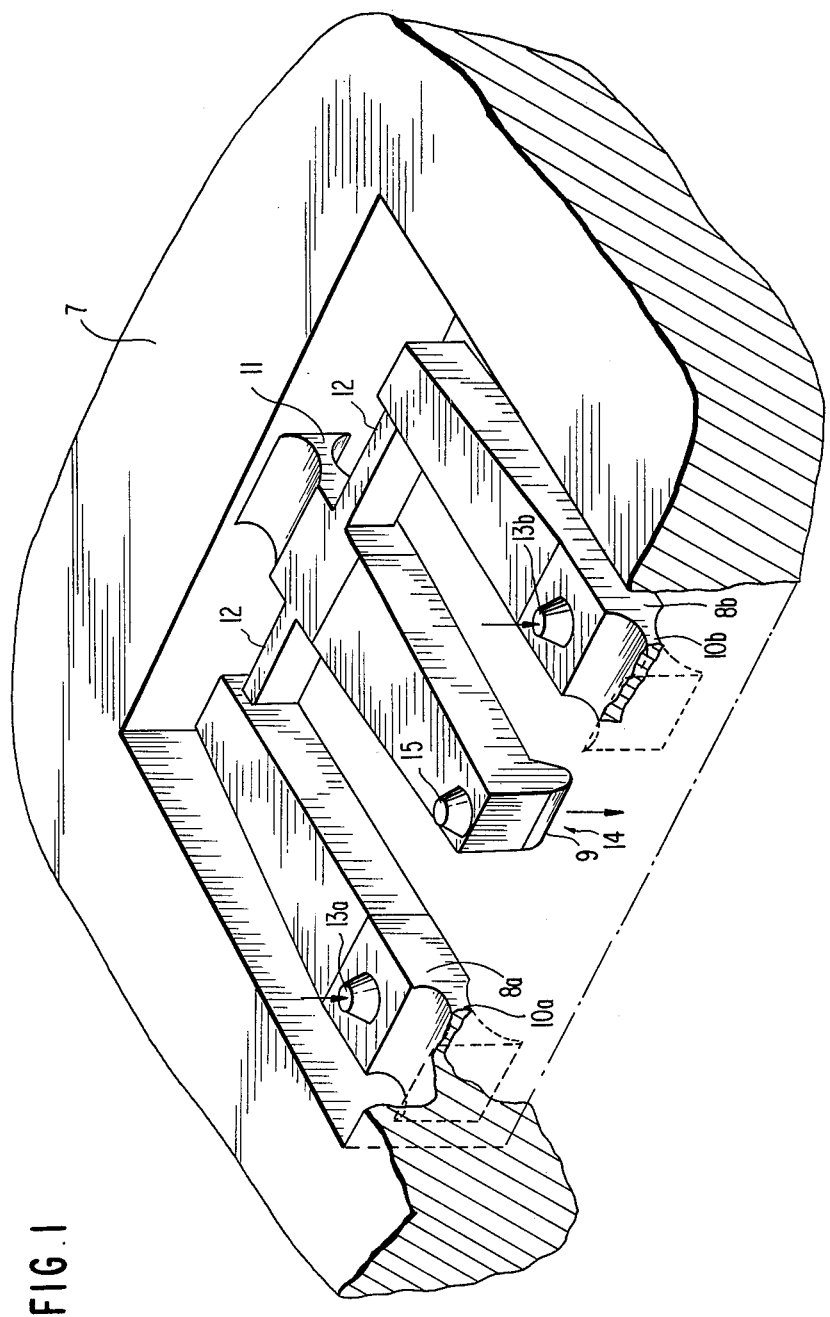

United States Patent [19]

Weiger et al.

[11] Patent Number: 4,460,840
[45] Date of Patent: Jul. 17, 1984

[54] TEMPERATURE COMPENSATED PIEZOELECTRIC ACTUATOR ARRANGEMENT

[75] Inventors: Günter Weiger, Esslingen; Paul Schwerdt, Freundenstadt; Helmut Hirn, Dusslingen, all of Fed. Rep. of Germany

[73] Assignee: Daimler-Benz Aktiengesellschaft, Stuttgart, Fed. Rep. of Germany

[21] Appl. No.: 372,571

[22] Filed: Apr. 28, 1982

[30] Foreign Application Priority Data

Apr. 28, 1981 [DE] Fed. Rep. of Germany ....... 3116687

[51] Int. Cl.³ .......................................... H01L 41/08
[52] U.S. Cl. .................................... 310/328; 310/346
[58] Field of Search ...................... 310/321, 328, 346

[56] References Cited

U.S. PATENT DOCUMENTS

| | | | |
|---|---|---|---|
| 3,461,910 | 8/1969 | Selsam et al. | 310/328 X |
| 3,524,196 | 8/1970 | Church et al. | 310/328 |
| 3,614,486 | 10/1971 | Smiley | 310/317 X |
| 3,649,857 | 3/1972 | Knappe | 310/328 X |
| 4,318,023 | 3/1982 | O'Neill | 310/321 X |

Primary Examiner—Mark O. Budd
Attorney, Agent, or Firm—Craig & Burns

[57] ABSTRACT

An electronically controlled actuator arrangement with a temperature-compensated piezoelectric transducer. The transducer includes at least one stack of piezoelectric oxide discs. The actuator arrangement includes a mechanical throw-transmitting lever system arranged in series with the transducer. The lever system includes one or more levers and is integrated into a plane-parallel plate. When the actuator arrangement is in a rest position, a force introduction point or points lies flush with one plane face of the plate and a force deployment point or points lies flush with an opposite plane face of the plate. By virtue of the actuator arrangement, the lever system is not, to any substantial extent, affected by the temperature. The actuator arrangement is especially suitable for rapid-action hydraulic valves.

7 Claims, 2 Drawing Figures

TEMPERATURE COMPENSATED PIEZOELECTRIC ACTUATOR ARRANGEMENT

The present invention relates to an actuator arrangement and, more particularly, to an electrically controlled actuator arrangement having a temperature-compensated piezoelectric transducer which includes, at a minimum, one stack of piezoelectric oxide discs.

Piezoelectric actuators have been proposed in, for example, Offenlegungsschrfits 15 23 510, 17 51 543, and 29 18 377, with the distinguishing features of such actuators residing in, for example, short actuation times, low power requirement, high positioning accuracy, and comparatively high switching forces.

A disadvantage of the proposed piezoelectric actuators resides in the fact that, especially with hydraulic valves, such actuators have a relatively short throw, an in this context, the effects of thermal expansion on the positioning accuracy of the actuators is particularly disadvantageous.

The aim underlying the present invention essentially resides in providing an electrically controlled piezoelectric actuator which has as large a throw as possible accompanied by a high degree of positioning accuracy, and an actuator which is affected as little as possible by temperature fluctuations, while nevertheless maintaining the overall length of the actuator relatively short.

In accordance with advantageous features of the present invention, an electrically controlled actuator is provided with a temperature compensated piezoelectric transducer formed by at least one stack of piezoelectric oxide discs, wherein a mechanical-throw-transmitting lever system is arranged in series with the transducer. The layer system advantageously includes one or more levers integrated or integrally formed in a plane parallel plate, with force introduction points of the lever system being arranged flush with one plane surface of the plate when the lever system is in a rest position, and force deploying points of the lever system lying in an opposed plane face of the plate when the lever system is in the rest position.

Advantageously, in accordance with further features of the present invention, the plate and levers are connected with each other by spring joints which are machined from the solid plate material.

Preferably, the lever system forming the mechanical-throw-transmission is a two stage system, with a plurality of levers being provided and being disposed side-by-side in an axial direction of the plate, and with at least a tie connector means, capable of transmitting torsion, being provided for laterally connecting adjacent levers to one another.

According to the present invention, the lever system includes a pair of levers forming a first transmission stage which are symmetrically disposed with respect to a further lever forming the second transmission stage.

In accordance with still further features of the present invention, the force introduction and force deployment points are arranged in a plane which is disposed in the system axis of the actuator.

Advantageously, the electronically controlled actuator of the present invention may be disposed in, for example, a piezoelectrically ball-type hydraulic valve.

Accordingly, it is an object of the present invention to provide an electrically controlled actuator arrangement with a temperature compensated piezoelectric transducer which avoids, by simple means, shortcomings and disadvantages encountered in the prior art.

Another object of the present invention resides in providing an electrically controlled actuator arrangement with a temperature compensated piezoelectric transducer which is minimally if not completely uneffected by temperature.

Yet another object of the present invention resides in providing an electrically controlled actuator arrangement with a temperature compensated piezoelectric transducer which is readily suitable for rapid-action hydraulic valves.

A further object of the present invention resides in providing an electrically controlled actuator arrangement which ensures an accurate positioning of the actuating elements.

A still further object of the present invention resides in providing an electrically controlled actuator arrangement which is simple in construction and therefore relatively inexpensive to manufacture.

Yet another object of the present invention resides in providing an electronically controlled actuator arrangement which functions realiably under all operating conditions.

Figure 2:
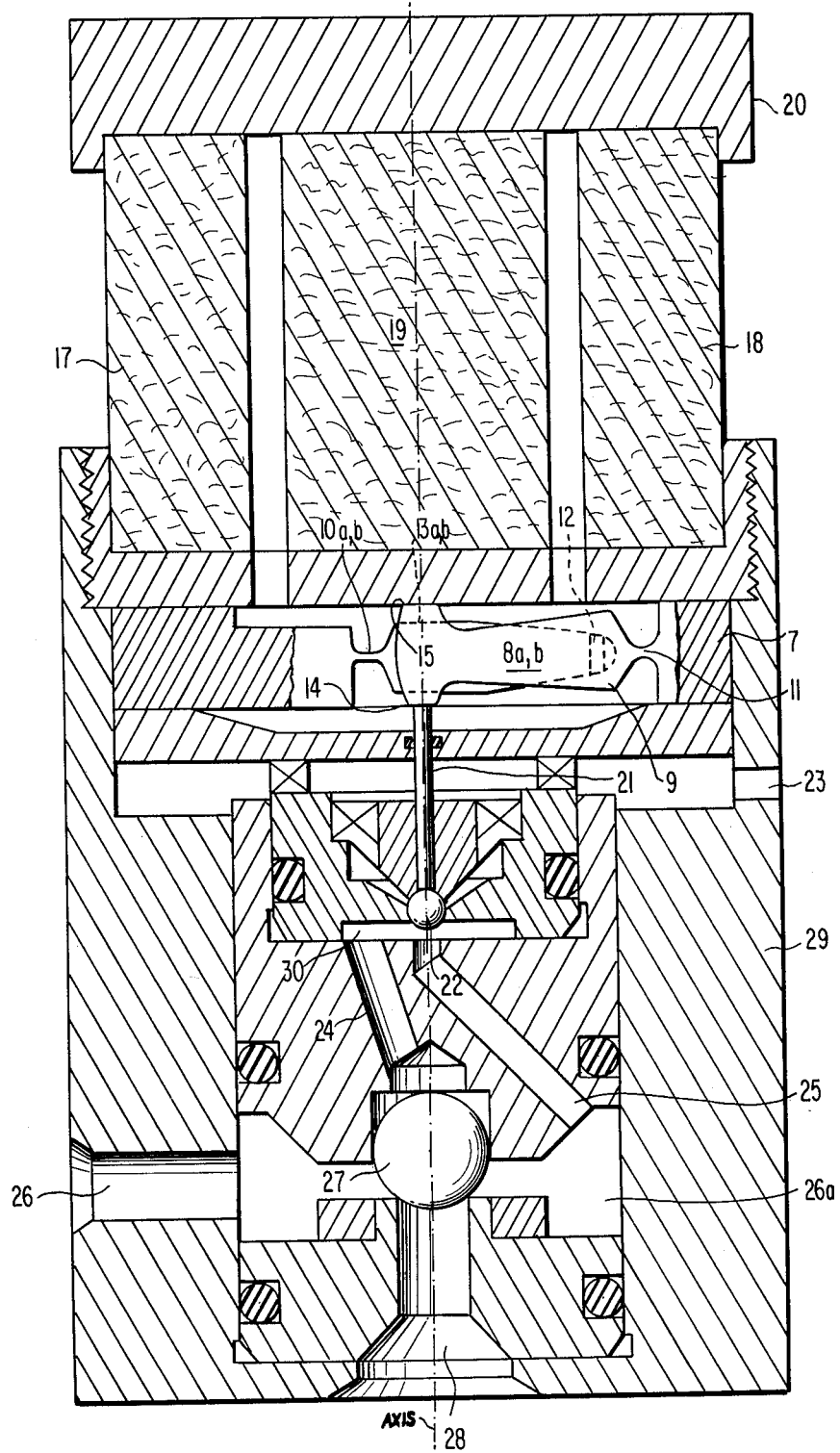

These and other objects, features, and advantages of the present invention will become more apparent from the following description when taken in connection with the accompanying drawing which shows, for the purposes of illustration only, two embodiments in accordance with the present invention, and wherein:

FIG. 1 is a prespective view of a two stage lever system for an electrically controlled actuator constructed in accordance with the present invention; and FIG. 2 is a cross sectional view of the two stage lever system of FIG. 1 arranged in a piezoelectrically operated ball-type hydraulic valve.

Referring now to the drawings wherein like reference numerals are used in both views to designate like parts and, more particularly, to FIG. 1, according to this Figure, a two-stage lever system is integrated into a plane-parallel plate 7, with the plate 7 and levers 8a, 8b, 9 of the two stage system being integrally formed in one piece with the plate 7. The levers 8a, 8b, 9 are disposed adjacent one another in an axial direction of the plate 7 and are connected to the plate 7 through spring joints 10a, 10b, 11, with the spring joints 10a, 10b, 11 being machined from the solid material of the plate 7. The levers 8a, 8b, are arranged symmetrically with respect to the lever 9 and form a first stage of the two-stage lever system. The lever 9, forming the second stage of the two-stage lever system, is connected to each of the two other levers 8a, 8b by tie connectors 12, with the respective tie connectors 12 being capable of transmitting torque.

In the normal or rest position of the two-stage lever system, the points 13a, 13b on the levers 8a, 8b representing the points at which the force is introduced, and the point generally designated by the reference numeral 14 on the lever 9, representing the point at which the force is deployed, and a surface 15, facing or disposed oppositely the force deployment 14, lie flush with the faces of the plate 7. In order to prevent undesired distortion or twisting when the lever system is operated, the points 13a, 13b at which the force is introduced, and the point 14, at which the force is deployed, lie in a common plane which contains the lever system axis. The lever system axis is located perpendicularly to the faces of the plane-parallel plate 7, and extends through the point 14 at which the force is deployed. The forces acting on the deployed by the lever system are respectively indicated by the arrows in FIG. 1.

The mode of operation of the two-stage lever system will be described hereinbelow in connection with the piezoelectric operated ball-type hydraulic valve.

As shown in FIG. 2, a piezoelectrically operated ball-type hydraulic valve includes a piezoelectric transducer and spacer elements 17, 18 attached to a common base plate 20, with the spacer elements being located symmetrically with respect to the transducer 19.

The ball-type hydraulic valve, essentially of conventional construction, is disposed in a housing 29 and includes a first ball 22, operated by a plunger 21, a further ball 27, a pressure inlet passage 26 with an adjoining annular space 26a, an outlet passage 28 to a consumer (not shown), hydraulic medium passages 24, 25, 30 and a return flow passage 23 for the hydraulic medium. The outlet passage 28 is adapted to be closed by the ball 28, with the ball 22 being adapted to control the communication between the passages 24, 25, 30 and return flow passage 23. The plane-parallel plate 7, with integrated lever system, is installed inside the housing 29 in such a manner that the force deployment point 14 rests on the plunger 21, with the force introduction points 13a, 13b of the levers 8a, 8b and surface 15 of the lever 9 bear against the piezoelectric transducer 19.

In the illustrated initial or rest position of the ball-type hydraulic valve, the outlet passage 28 to the consumer is closed and the pressurized hydraulic medium is supplied from the inlet passage 26 through the annular space 26a and passages 25, 30, 24 so as to press or urge the ball 27 into the lower seated position. At the same time, the ball 22 is pressed or urged upwardly by the pressure of the pressure medium thereby closing the communication between the passage 30 and the return flow passage 23. If the transducer 29 is now electrically excited, the transducer expands downwardly and presses or urges against the force introduction points 13a, 13b of the levers 8a, 8b such that the two levers 8a, 8b are resiliently deflected downwards and, in being so deflected, carry, through the tie connectors 12, the lever 9 resulting in the lever 9 moving the plunger 21 downwardly and thereby displacing the ball 22 from the seated position. The ball 22 comes to rest in a valve seat area of the bore 25 and interrupts the inflow or supply of pressure medium from the space 26a to the space 30.

With the ball 22 interrupting the flow of pressure medium to the space 30, hydraulic medium in the space 30 and passage 24 can now flow into the return flow passage 23, as a result of which the pressure in the passage 24 is reduced allowing the ball 27 to move upwardly.

As a result of the movement of the ball 27, the outlet passage 28 is opened to the consumer so that the hydraulic medium can now flow from the inlet passage 26 directly to the consumer for as long a period of time as the piezoelectric transducer is excited The side-by-side arrangement of the levers 8a, 8b, 9 permits the plate 7 to be relatively thin thereby leading to either a very slight or total absence of temperature related effects in the same manner as does the form or construction of the piezoelectric actuator due to the fact that the spacer elements 17, 18 are either composed of the same material as the piezoelectric transducer 19 or have the same thermal expansion characteristics as the transducer 19.

A precise initial positioning of the levers 8a, 8b, 9 of the lever system results from the fact that the lever 9 bears, on the one hand, in the rest position, flush against the piezoelectric transducer 19, and, on the other hand, against the plunger 21, with this initial position being uneffected even by temperature fluctuations.

While we have shown and described two embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. An electrically controlled actuator arrangement including a temperature compensated piezoelectric transducer means, the transducer means comprising at least one stack of piezoelectric oxide discs, a mechanical throw transmitting means arranged in series with the transducer means, the transmitting means includes a plurality of levers so as to provide at least a two stage transmission action, the plurality of levers are disposed side-by-side in an axial direction of the plate means, connector means provided for connecting adjacent levers to each other, a plane-parallel plate means, the plurality of levers are integrated into the plate means in such a manner that, in a rest position of the actuator arrangement, at least one force introduction point lies flush with one plane of the plate means, and at least one force deployment point lies flush with an opposite plane face of the plate means.

2. An electrically controlled actuator arrangement according to claim 1, wherein the plate means and the plurality of levers are integrally formed in one piece, and spring joint means are provided for connecting the plurality of levers to the plate means.

3. An electrically controlled actuator arrangement according to claim 2, wherein the spring joint means are machined from a solid material of the plate means.

4. An electrically controlled actuator arrangement according to claim 1, wherein the transmission means are adapted to transmit torque.

5. An electrically controlled actuator arrangement according to claim 1, wherein the plurality of levers includes at least three levers, a pair levers forming one of the transmission stage, the third lever forming a second transmission stage, and the pair of levers are symmetrically disposed with respect to the third lever.

6. An electrically controlled actuator arrangement according to claim 1, wherein the force introduction and force deployment points form a system axis of the actuator arrangement.

7. An electrically controlled actuator arrangement according to claim 1, wherein the actuator arrangement is disposed in a hydraulic valve means.

* * * * *